United States Patent [19]

Inoue et al.

[11] Patent Number: 5,520,975
[45] Date of Patent: May 28, 1996

[54] MEDICAL MULTILAYER FILM AND CONTAINERS HAVING PLURALITY OF CHAMBERS

[75] Inventors: Fujio Inoue; Masamitsu Izumi; Shigetoshi Kashiyama, all of Naruto, Japan

[73] Assignee: Otsuka Pharmaceutical Factory, Inc., Naruto, Japan

[21] Appl. No.: 313,047

[22] PCT Filed: Feb. 2, 1994

[86] PCT No.: PCT/JP94/00143

§ 371 Date: Oct. 4, 1994

§ 102(e) Date: Oct. 4, 1994

[87] PCT Pub. No.: WO94/17772

PCT Pub. Date: Aug. 18, 1994

[30] Foreign Application Priority Data

Feb. 5, 1993 [JP] Japan .................... 5-018896
Aug. 6, 1993 [JP] Japan .................... 5-195668

[51] Int. Cl.⁶ .................... B29D 22/00; B29D 23/00; B32B 1/08; B65D 30/02
[52] U.S. Cl. .................... 428/35.9; 428/218; 428/515; 424/443; 424/444; 424/449
[58] Field of Search .................... 424/400, 473, 424/485; 428/35.9, 36

[56] References Cited

U.S. PATENT DOCUMENTS

| | | | |
|---|---|---|---|
| 4,407,874 | 10/1983 | Gehrke | 428/35 |
| 4,528,220 | 7/1985 | Hwo | 428/35.2 |
| 4,578,316 | 3/1986 | Clauson et al. | 428/516 |
| 4,643,928 | 2/1987 | Kimura et al. | 428/36 |
| 4,775,562 | 10/1988 | Shishido et al. | 428/35 |
| 4,891,253 | 1/1990 | Mueller | 428/35.2 |
| 4,929,479 | 5/1990 | Shishido et al. | 428/35 |
| 4,994,324 | 2/1991 | Bose et al. | 428/34.9 |
| 5,267,646 | 12/1993 | Inoue et al. | 206/204 |

FOREIGN PATENT DOCUMENTS

| | | |
|---|---|---|
| 0345774 | 12/1989 | European Pat. Off. . |
| 2023497 | 1/1980 | United Kingdom . |
| 2146614 | 4/1985 | United Kingdom . |

*Primary Examiner*—Thurman K. Page
*Assistant Examiner*—William E. Benston, Jr.
*Attorney, Agent, or Firm*—Armstrong, Westerman, Hattori, McLeland & Naughton

[57] ABSTRACT

A medical multilayer film chiefly for use in forming medical containers having a plurality of chambers comprises an inner layer, an intermediate layer and an outer layer each made primarily of a polyolefin, the inner layer being formed of resin mixture of an ethylene-alpha-olefin copolymer having a density of 0.930 to 0.945 g/cm³ and a polypropylene, the intermediate layer including at least one resin mixture layer of resin mixture of an ethylene-alpha-lefin copolymer having a density of 0.920 to 0.945 g/cm³ and an ethylene-alpha-olefin elastomer having a density of 0.880 to 0.890 g/cm³ in a mixing ratio by weight of 1:5 to 2:1, the resin mixture layer having a thickness of at least 85% of the overall thickness of the intermediate layer, the outer layer being formed of an ethylene-alpha-olefin copolymer having a density of 0.930 to 0.945 g/cm³. The film having this structure is excellent in any of heat resistance, transparency, flexibility, impact resistance and easily peelable sealing properties.

19 Claims, 3 Drawing Sheets

MEDICAL MULTILAYER FILM AND CONTAINERS HAVING PLURALITY OF CHAMBERS

TECHNICAL FIELD

The present invention relates to medical multilayer films which are excellent in heat resistance, transparency, flexibility, impact resistance, easily peelable sealing properties, etc. and to medical containers formed of said films and having a plurality of chambers.

Such medical containers have a plurality of chambers for individually accommodating unstable medical preparations (liquid, powdery or solid preparations) which are likely to change with time when mixed together, and a weak seal portion (easily peelable seal portion) separating the chambers and easily openable when desired by peeling to mix the medical contents of the chambers.

The term "easily peelable sealing properties" as used herein refers to such properties of a film that the film is capable of selectively forming a strong seal portion which is substantially not openable by peeling or a weak seal portion (hereinafter referred to as the "easily peelable seal portion") which is easily openable by peeling, one of the seal portions being formable by altering the fusing temperature for heat sealing.

BACKGROUND ART

Films for medical containers are generally formed by polyethylene or polypropylene which has high chemical stability to acids, alkalis, salts, etc. Also known as films for use in forming such medical containers having a plurality-of-chambers-are single-layer or two-layer films having a resin layer which is prepared from a molten mixture of alpha-polyolefin resins, such as polyethylene and polypropylene, which are different in compatibility.

For example, Unexamined Japanese Patent Publication No. 4671/1990 discloses a single-layer film of resin mixture of two components, i.e., a linear low-density polyethylene and polypropylene, or a single-layer film of resin mixture of three components, i.e., a linear low-density polyethylene, polypropylene and ethylene-propylene copolymer. A two-layer film is also disclosed which comprises an outer layer of linear low-density polyethylene, and an inner layer of resin mixture of linear low-density polyethylene and polypropylene. In the resin mixtures mentioned, polypropylene has the highest melting point and is used mainly to ensure easily peelable sealing properties.

However, the single-layer film of two-component resin mixture contains in the single-layer forming resin a large amount of polypropylene which is lower than polyethylene in transparency, flexibility and impact resistance, so that the container prepared from this film is low in usefulness in respect of transparency, flexibility and impact resistance.

Further, the problem of nonuniformity of the components is encountered with the single-layer film of three-component resin mixture when the mixture is made into the film. Stated more specifically, the ethylene-propylene copolymer which is amorphous or low in crystallinity and lowest in melting point is greater than the other two components and especially much greater than polypropylene in fluidity, with the result that the resin components of the film are likely to be present unevenly, It is therefore difficult for the film to effectively exhibit transparency, flexibility and impact resistance which are the outstanding characteristics of the ethylene-propylene copolymer resin. Moreover, it is difficult to uniformly disperse polypropylene in polyethylene and to form a film which has excellent easily peelable sealing properties, that is, which contains polypropylene as uniformly dispersed therein. The single-layer film wherein the component resins differ greatly in melting point encounter another problem when heat sealed. When the component resin of the highest melting point (polypropylene) starts to melt, the component resin of the lowest melting point (ethylene-propylene copolymer) has been excessively melted to flow in the form of a liquid, greatly reducing the thickness of the film to be heat sealed. Accordingly, the film is not heat sealable properly to give the desired strength to containers.

On the other hand, the two-layer film disclosed in the above-mentioned publication has slightly higher transparency and flexibility than the single-layer films since a linear low-density polyethylene (L-LDPE) is used for the outer layer, whereas this film is still unsatisfactory. Additionally, the film has a problem in respect of impact resistance when made into containers, especially when the container is cooled to 5° C. or lower. For these reasons, the two-layer film is not satisfactory for medical use and is not suited to use.

Further because much consideration is not given to the heat resistance of these films, containers formed of these films and having a plurality of chambers are likely to give undesirable results. When the container is sterilized with high-pressure steam or hot water under a high-temperature condition (e.g., 121° C. for 20 minutes), the resin present in the film (linear low-density polyethylene or ethylene-propylene copolymer) fails to withstand the sterilizing temperature to melt or foam, deforming or rupturing the container or permitting a leak through the sealed portion. It is further likely that the polyethylene will dissolve out in the form of fine particles. At the easily peelable seal portion providing a partition between the chambers and rendering the partition easily openable, the linear low-density polyethylene or ethylene-propylene copolymer similarly fails to withstand the sterilizing temperature to melt, consequently increasing the seal strength of the easily peelable seal portion to a level comparable to the strength of the hermetic seal portions (strong seal portions) other than the easily peelable seal portion, hence low usefulness. The sterilization at the temperature of 121° C. also lowers the transparency and flexibility which are not negligible items of evaluation since these properties greatly influence the handling of the container at the site of medical treatment.

DISCLOSURE OF THE INVENTION

The main object of the present invention is to overcome the foregoing problems and to provide a medical film and a container having a plurality of chambers which are excellent in any of heat resistance, transparency, flexibility, impact resistance and easily peelable sealing properties.

Other features of the invention will become apparent from the following description.

The present invention provides a medical multilayer film characterized in that the film comprises an inner layer, an intermediate layer and an outer layer each made primarily of a polyolefin, the inner layer being formed of resin mixture of an ethylene-alpha-olefin copolymer having a density of 0.930 to 0.945 g/cm$^3$ and a polypropylene, the intermediate layer including at least one resin mixture layer of resin mixture of an ethylene-alpha-olefin copolymer having a density of 0.920 to 0.945 g/cm³ and an ethylene-alpha-olefin elastomer having a density of 0.880 to 0.890 g/cm³ in a mixing ratio by weight of 1:5 to 2:1, the resin mixture layer having a thickness of at least 85% of the overall thickness of the intermediate layer, and the outer layer being formed of an ethylene-alpha-olefin copolymer having a density of 0.930 to 0.945 g/cm³.

To give further improved heat resistance to the multilayer film as a preferred mode of the present invention, the intermediate layer has in the middle thereof a layer of an ethylene-alpha-olefin copolymer having a density of 0.930 to 0.945 g/cm³.

The container of the invention having a plurality of chambers is prepared from the multilayer film described.

The ethylene-alpha-olefin copolymer for use in the present invention comprises ethylene as the main comonomer and contains a specified proportion of alpha-olefin. The copolymer may be in the form of a random copolymer, block copolymer or graft copolymer.

The ethylene-alpha-olefin elastomer is an ethylene-alpha-olefin copolymer which is amorphous or low in crystallinity.

Examples of useful alpha-olefins for use in the ethylene-alpha-olefin copolymer or ethylene-alpha-olefin elastomer are those having 3 to 12 carbon atoms, such as propylene, 1-butene, 1-pentene, 1-hexene, 4-methyl-1-pentene, 1-heptene, 1-octene, 1-nonene, 1-decene, 1-undecene and 1-dodecene. Among these, 1-butene is suitable for use in the copolymer. Especially, a linear polymer is desirable as the ethylene-alpha-olefin copolymer. The ethylene-alpha-olefin copolymer having a density of 0.930 to 0.945 g/cm³ for use in the present invention is preferably 1.0 to 3.0 in Mw/Mn. The copolymer then gives a film of high transparency. Mw stands for weight average molecular weight, and Mn for number average molecular weight.

BEST MODE OF CARRYING OUT THE INVENTION

Figure 1:
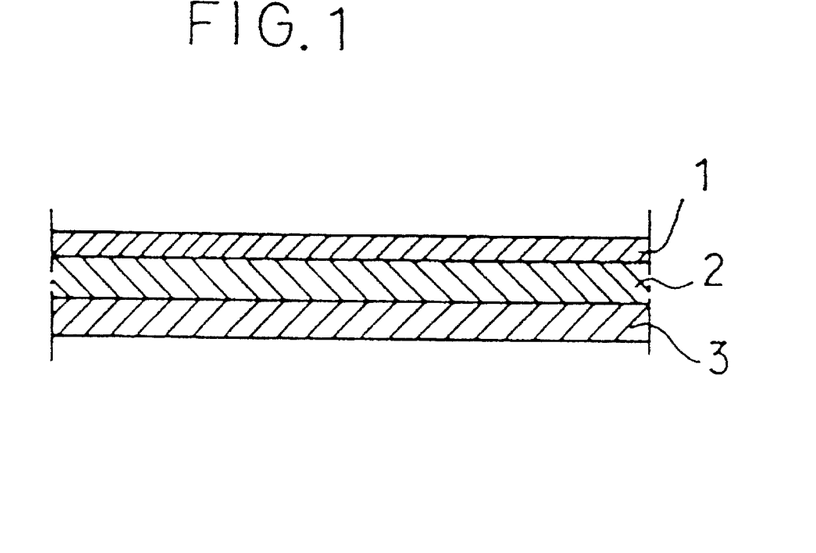
FIG. 1 is an enlarged view in vertical section showing a multilayer film embodying the invention.

With reference to FIG. 1, the medical multilayer film embodying the present invention comprises an inner layer 1, intermediate layer 2 and outer layer 3. The inner layer 1 is the innermost layer to be in contact with the solid or liquid medicinal preparation to be accommodated in containers formed of the film. The outer layer 3 is the outermost layer to be in contact with the outside air. The intermediate layer 2 includes all layers between the inner layer 1 and the outer layer 3. According to the invention, the intermediate layer 2 is in the form of a single layer (see FIG. 1) or a multiplicity of layers (see FIG. 2).

To enable the inner layer 1 to form an easily peelable seal, this layer is prepared from a resin mixture of ethylene-alpha-olefin copolymer and polypropylene. To give the layer improved heat resistance without impairing the transparency and flexibility thereof, the ethylene-alpha-olefin copolymer to be used has a density which is in the range of 0.930 to 0.945 g/cm³. The density is more suitably 0.938 to 0.942 g/cm³ most suitably 0.940 to 0.942 g/cm³.

The polypropylene to be used can be a propylene homopolymer or a copolymer of propylene and an alpha-olefin.

The copolymer of propylene and alpha-olefin comprises propylene as the main comonomer and contains a specified proportion of alpha-olefin. The copolymer may be in the form of a propylene random copolymer, propylene block copolymer or propylene graft copolymer. Besides ethylene, examples of alpha-olefins present in such copolymers are 1-butene, 1-pentene, 1-hexene, 4-methyl-1-pentene, 1-heptene, 1-octene, 1-nonene, 1-decene, 1-undecene, 1-dodecene and like olefins having 4 to 12 carbon atoms. Preferably, the copolymer comprises propylene and ethylene.

When the propylene is a copolymer, it is required that the copolymer have nearly the same heat resistance as propylene homopolymer. Accordingly, the proportion of alpha-olefin to be mixed with propylene is relatively small. For example when the alpha-olefin is ethylene, the proportion is up to 20 wt. %, preferably up to 10 wt. %, more-preferably up to 5 wt. %. The term "polypropylene" as used hereinafter includes both the homopolymer and the copolymer, unless otherwise stated.

The polypropylene can be 1.0 to 7.0 g/10 min (230° C.) in melt flow rate (MFR). For example, when the ethylene-alpha-olefin copolymer is about 2.2 g/10 min (190° C.) in MFR, it is suitable to use a propylene homopolymer which is about 3.0 to about 7.0 g/10 min (230° C.) in MFR.

According to the present invention, the ethylene-alpha-olefin copolymer having a density in the above-specified range and polypropylene having relatively high compatibility with the copolymer are used to obtain a generally uniform mixture of these resins. This makes it possible to obtain an inner layer which is excellent in properties to form easily peelable seal portion and to prepare a product having an easily peelable seal portion which is openable with a stabilized force.

The resin mixture of polypropylene and ethylene-alpha-olefin copolymer has a wide sealing temperature range permitting formation of easily peelable seal portions and is almost free of the influence of variations in atmospheric temperature at the sealing work site, so that seal strength is readily available always with good stability. Moreover, even if the resin mixture is heated for sterilization of the container with high-pressure steam or with hot water under a high temperature condition (e.g., 121° C. for 20 minutes), the ethylene-alpha-olefin copolymer with a density of 0.930 to 0.945 g/cm³ and polypropylene constituting the mixture exhibit high heat resistance, have a high melting point and remain unmelted, with the result that the easily peelable seal portion retains easily peelable seal properties without exhibiting an increased seal strength.

The mixing ratio of ethylene-alpha-olefin copolymer to polypropylene further influences the sealing properties and openability of the easily peelable seal portion. A good result is obtained when the mixing ratio (by weight) of the former to the latter is 1:2 to 3:1, especially 2:3 to 2:1. If the amount of polypropylene mixed is less than the above range, impaired openability will result. Alternatively if it is over the above range, the sealing properties become insufficient, hence an undesirable result. The thickness of the inner layer 1 to be determined is in the range of about 10 to about 50 μm, preferably 25 to 35 μm, so as not to impair the transparency and flexibility. The thickness is up to about 50%, preferably about 5 to about 25%, of the overall thickness of the multilayer film.

For the intermediate layer 2 to retain unimpaired transparency and flexibility and to impart flexibility and impact resistance to the overall film, this layer is prepared from a resin mixture of ethylene-alpha-olefin copolymer with a density of 0.920 to 0.945 g/cm$^3$ and ethylene-alpha-olefin elastomer with a density of 0.880 to 0.890 g/cm$^3$ in a mixing ratio of 1:5 to 2:1, preferably 2:5 to 1:2, more preferably 3:7. Especially suitable to use is a mixture comprising a linear polymer. The density of the ethylene-alpha-olefin copolymer, as well as that of the ethylene-alpha-olefin elastomer, is suitably determined from the above range in accordance with the purpose of use. For example, to give further improved heat resistance to the overall film of the invention, the ethylene-alpha-olefin copolymer to be used has a density of 0.930 to 0.945 g/cm$^3$ preferably 0.938 to 0.942 g/cm$^3$, more preferably 0.940 to 0.942 g/cm$^3$.

On the other hand, the ethylene-alpha-olefin elastomer to be used is preferably 0.883 to 0.887 g/cm$^3$, more preferably 0.885 g/cm$^3$ in density to impart improved flexibility to the overall film.

The resin mixture to be used is suitably up to about 0.910 g/cm$^3$ especially preferably 0.900 to 0.910 g/cm$^3$ in density.

Figure 2:
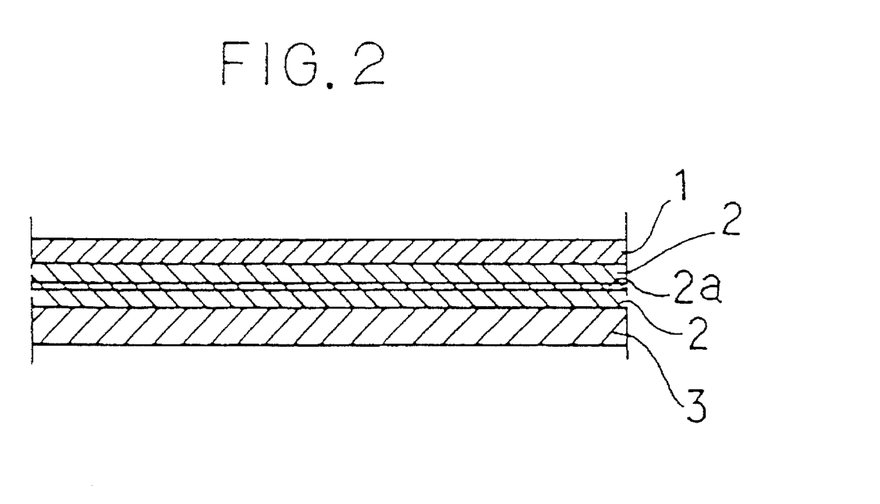
FIG. 2 is an enlarged view in vertical section showing another multilayer film embodying the invention.
Figure 3A:
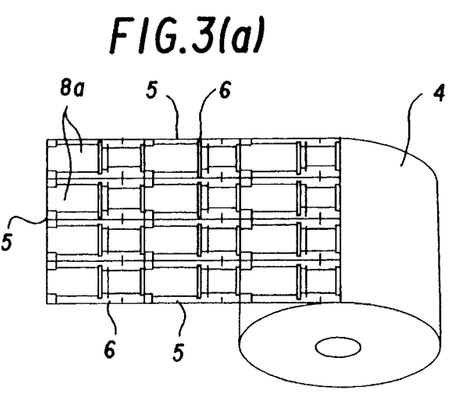
FIG. 3 includes diagrams for illustrating stepwise an example of process for producing containers having a plurality of chambers and embodying the invention.
Figure 3B:
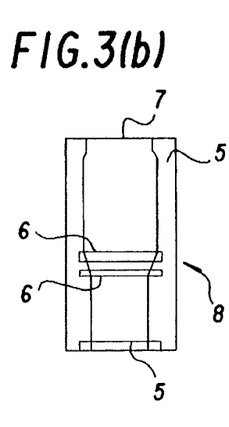
Figure 3C:
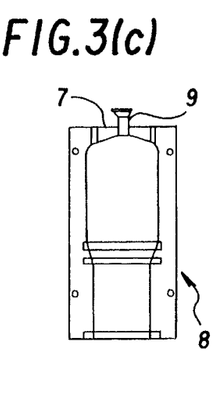
Figure 3D:
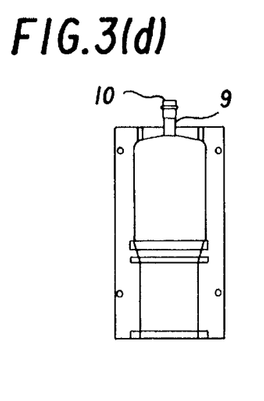
Figure 3E:
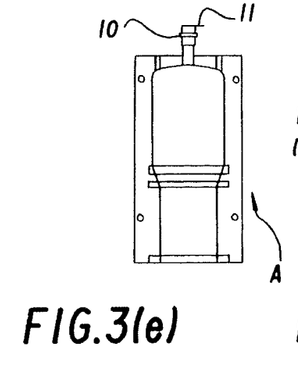
Figure 3F:
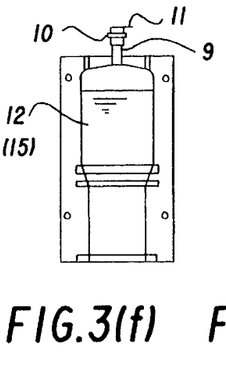
Figures 3G, 3H:
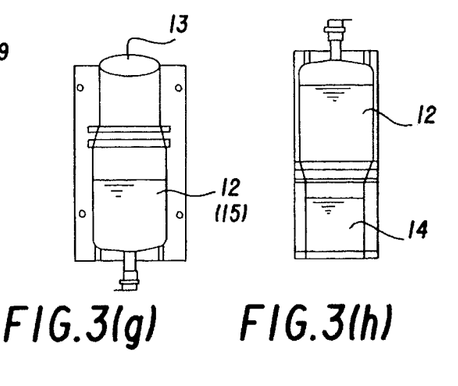
Figure 3I:
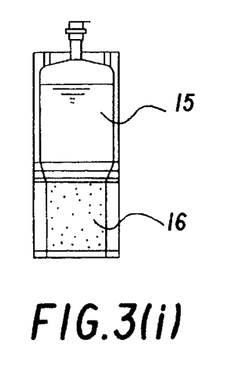

The intermediate layer 2, which may be a single layer as described above, may alternatively be of a multilayer structure comprising the above resin layer and another resin layer, for example, other resin layer 2a formed in an intermediate portion of the intermediate layer 2 as shown in FIG. 2. To give further improved heat resistance, the resin to be used for the other resin layer 2a is desirably an ethylene-alpha-olefin copolymer having a density of 0.930 to 0.945 g/cm$^3$, preferably 0.938 to 0.942 g/cm$^3$, more preferably 0.940 to 0.942 g/cm$^3$. It is desirable that the layer 2a be inserted in the middle of the intermediate layer and have a thickness which is up to 15% of the thickness of the overall intermediate layer.

The overall thickness of the intermediate layer 2 to be determined suitably is in the range of about 70 to about 150 μm, preferably about 80 to about 140 μm, more preferably about 110 to about 140 μm so as to be about 40 to about 85%, preferably about 45 to about 80%, more preferably about 60 to about 80%, of the overall thickness of the multilayer film.

The outer layer 3, which needs to be transparent and flexible, must have durability to withstand the temperature condition of heat sterilization, for example, high-pressure steam sterilization or hot water sterilization at 121° C. for 20 minutes. The resin to be used and the structure are as follows. It is suitable to use an ethylene-alpha-olefin copolymer which has a density in the range of 0.930 to 0.945 g/cm$^3$ preferably 0.938 to 0.942 g/cm$^3$, more preferably 0.940 to 0.942 g/cm$^3$. Among such copolymers a linear polymer is more suitable to use. The thickness of the outer layer 3 to be determined is in the range of about 15 to about 65 μm, more preferably 20 to 35 μm, and is up to about 40%, more preferably about 5 to about 25%, of the overall thickness of the multilayer film.

The multilayer film of the present invention is produced by the water-cool or air-cool coextrusion blown tubular inflation process, coextrusion T-die process, lamination process or like known process. It is especially desirable to employ the coextrusion process, which forms a resin extrudate of uniform thickness with an improved efficiency and is less likely to deteriorate the resin during extrusion, consequently permitting the layers to retain their respective characteristics and giving a product of high transparency and high flexibility. Further when formed by the coextrusion process, the resin mixture layer is in the form of a generally uniform mixture, which enables the layer to exhibit in its entirety the characteristics of the resin components. The multilayer film is in the form of a tube or sheet. The temperature condition for production is 150° to 270° C., preferably 165° to 230° C. Since the layers 1, 2 and 3 contain an ethylene-alpha-olefin copolymer as a common component, the layers can be bonded to one another by fusion readily when made into a multilayer film. It is desired that the resins forming the respective layers be reduced in the difference in melt flow rate (MFR) therebetween so as to be uniform in thickness and extrudability. Further with the multilayer film of the invention, one layer may be made in the form of at least two divided layers as prepared by coextrusion. This further improves the overall film in transparency and flexibility.

In this case, the two layers are made of the same resin and are therefore handled as a single layer even if in the form of a multilayer extrudate.

Preferably, the ethylene-alpha-olefin copolymer to be present in the respective layers has a density of 0.930 to 0.945 g/cm$^3$, especially a density value close to 0.945 g/cm$^3$ since this reduces the content of low-molecular-weight substances in the resin. When the ethylene-alpha-olefin copolymer used is 1.0 to 3.0 in Mw/Mn, the low-molecular-weight substance content of the resin is further reduced. Further when the polypropylene used has a reduced MFR value (230° C.), the amount of low-molecular-weight substances is still smaller. However, it is desired to reduce the MFR value (230° C.) to an extent not to impair the flexibility. Use of these resins diminishes an interaction between antibiotics and the low-molecular-weight substance in the resin to obviate the adverse reaction. Accordingly, the low-molecular-weight substance need not be removed by a treatment, i.e., by preheating the resin material in a vacuum or maintaining the material in a vacuum during formation of film or using n-hexane or hot water for extraction or washing. This lowers the production equipment cost.

According to the invention, the heat resistance, transparency and flexibility possessed by the layers 1, 2 and 3 give high heat resistance, transparency and flexibility to the film in its entirety. The intermediate layer 2 and the outer layer 3 give excellent impact resistance, while the inner layer 1 affords excellent easily peelable sealing properties. Thus, the present invention provides a medical multilayer film which is outstanding in heat resistance, transparency, impact resistance and easily peelable sealing properties. Since ethylene-alpha-olefin copolymer is used for the outer layer, the multilayer film of the invention has the advantage that for example when a cover of multilayer barrier film (having an inner layer of ethylene-alpha-olefin copolymer) is to be attached to the outer side of the present film by fusion, the cover can be readily bonded thereto thermally.

The multilayer film of the present invention also provides a medical container having a plurality of chambers which are partitioned by an easily peelable seal or the like for individually accommodating medicinal preparations which are likely to change with time if mixed together, such that the preparations can be mixed together or made into a solution when to be used. Like the multilayer film of the invention, the container obtained is excellent in heat resistance, transparency, flexibility, impact resistance and easily peelable sealing properties.

The medicinal preparations to be enclosed in the container having a plurality of chambers may be powdery, liquid or solid. Examples of powdery preparations are substances which are hygroscopic or susceptible to oxidation or thermal degradation, such as antibiotics, anticancer agents, steroid agents, fibrinolytic agents, vitamins, etc. Examples of liquid preparations are physiological saline, glucose solutions, distilled water for injection, electrolytic solutions, amino acid solutions, emulsions of fats, etc.

Using the multilayer film of the invention, containers having a plurality of chambers are produced, for example, by the following process. FIG. 3 shows stepwise an example of process for producing such containers. A container A having a plurality of chambers can be obtained by successively executing the following steps (a) to (e).

Step (a)

A tubular multilayer film 4 obtained by the blown tubular process is sealed at a fusing temperature of 155° to 185° C. to provide container peripheral portions (strong seal portions 5), and is also sealed at a fusing temperature of 105° to 150° C. to form easily peelable seal portions (weak seal portions 6) approximately at the central portion of each container to be formed, whereby a multiplicity of container blanks 8a are prepared which are arranged in rows horizontally and vertically.

Step (b)

The container blanks 8a are cut off from the multilayer film 4 after sealing, and a container body 8 having a port 7 for attaching a port member is prepared from each of the blanks 8a.

Step (c)

The port member 9 is inserted into the port 7 of the container body 8 and attached to the body by fusing means.

Step (d)

A cap 10 is attached to an outer opening portion of the port member 9 by fusing means to close the container body.

Step (e)

A peel seal 11 which is easily removable is attached to an outer opening portion of the cap 10 by fusing means to obtain a container A having a plurality of chambers.

For example in the case where highly reactive medicinal liquid preparations are to be enclosed individually in upper and lower container portions which are partitioned by the easily peelable seal portions (weak seal portions 6), a highly reactive medicinal liquid preparation 12 is filled into one of the container portions through the port member 9 in the state shown in FIG. 3, (c), followed by the above steps (d) to (e). The container is now in the state shown in FIG. 3, (f). As shown in FIG. 3, (g), the seal portion of the empty chamber is cut to form a filling opening 13. A highly reactive medicinal liquid preparation 14 is filled into the chamber through the opening 13, which is thereafter sealed off, followed by heat sterilization with high-pressure steam or hot water. After the sterilization, the container is externally dried and adjusted to a predetermined shape. FIG. 3, (h) shows the container in this state.

On the other hand, for example when a medicinal preparation such as an antibiotic and a medicinal preparation such as a dissolving liquid are to be enclosed individually in the upper and lower container portions, the dissolving liquid 15 is filled into one of the container portions through the port member 9 in the state shown in FIG. 3, (c), followed by the steps (d) to (e). The container is sterilized with high-pressure steam or hot water in the state shown in FIG. 3, (f), thereafter externally dried, and cut at the seal portion of the empty chamber as seen in FIG. 3, (g) to form a filling opening 13. Clean air is forced into the chamber through the opening 13 for drying, the antibiotic or like medicinal preparation 16 is filled into the chamber through the opening 13 under an aseptic condition, the filling opening 13 is thereafter sealed off, and the container is adjusted to a predetermined shape. FIG. 3, (i) shows the container in this state.

Figure 4:
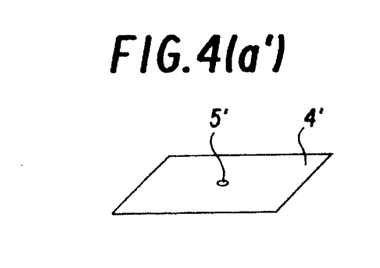
FIG. 4 includes diagrams for illustrating stepwise another example of process for producing containers having a plurality of chambers and embodying the invention.

FIG. 4 shows stepwise another example of process for producing containers having a plurality of chambers. Such containers A' can be obtained by successively executing the following steps (a') to (e').

Step (a')

A multilayer film is cut to a piece of film 4' having a specified size, and an aperture 5' for an opening member 6' is formed in the center of the film 4'.

Step (b')

The opening member 6' is attached to the apertured portion 5' of the film 4' on the outer layer side thereof by fusing means.

Step (c')

The film 4' is folded in two with the opening member 6' positioned in the center.

Step (d')

The film 4' as folded in two is sealed along the peripheral portion except at filling openings 7', 8' at a fusing temperature of 155° to 185° C. to form strong seal portions 9' and prepare a container body.

Step (e')

An easily peelable seal portion (weak seal portion) 10' is formed at an intermediate portion of the container body at a fusing temperature of 105° to 150° C. to obtain a container A' having a plurality of chambers.

For example in the case where highly reactive medicinal liquid preparations are to be filled separately into the respective upper and lower container portions which are partitioned by the easily peelable seal portion 10', the medicinal liquid preparations 11', 12' are filled into the upper and lower container portions through the filling openings 7', 8', which are then sealed off, followed by sterilization with high-pressure steam or hot water. The container is thereafter externally dried and adjusted to a predetermined shape. FIG. 4, (f') shows the container in this state.

On the other hand, for example when a medicinal preparation such as an antibiotic and a medicinal preparation such as a dissolving solution are to be enclosed in the upper and lower container portions, the dissolving solution 13' is filled into the liquid chamber through the filling opening 7' therefor in the state shown in FIG. 4, (e'), the two filling openings 7', 8' are thereafter sealed off, and the container is sterilized with high-pressure steam or hot water. FIG. 4, (g') shows the container in this state. The container is externally dried after The sterilization, the opening 8' for the empty chamber is opened again by cutting as shown in FIG. 4, (g'), and clean air is forced into the chamber through the opening for drying. As shown in FIG. 4, (h'), the antibiotic or like medicinal preparation 14' is filled into the chamber through the reopened opening 8' under an aseptic condition, the filling opening 8' is thereafter sealed off as shown in FIG. 4, (i'), and the container is adjusted to a predetermined shape to complete the filling operation.

Examples are given below in which medical multilayer films and containers of the invention were prepared. Further given are examples in which these products were tested.

EXAMPLE 1

Using a water-cooled coextrusion blown tubular machine, a three-layer film was prepared which had an inner layer, intermediate layer and outer layer. The inner layer was a 30μm-thick layer of resin mixture of a linear medium-density polyethylene (ethylene-1-butene copolymer, product of Mitsui Petrochemical Industries, Ltd., 0.941 g/cm$^3$ in density, 2.2 g/10 min (190° C.) in MFR, 2.4 in Mw/Mn, hereinafter referred to as "PE (1)") and a propylene homopolymer (product of Mitsui Petrochemical Industries, Ltd., 0.910 g/cm$^3$ in density, 4.0 g/10 min (230° C.) in MFR, (hereinafter referred to as "PP (1)") in a mixing ratio of 3:2. The intermediate layer was a 115-μm-thick layer of resin mixture of PE (1) and an ethylene-alpha-olefin elastomer (ethylene-1-butene copolymer, product of Mitsui Petrochemical Industries, Ltd. with the brand name "TAFMER A," 0.885 g/cm$^3$ in density, 0.5 g/10 min (190° C.) in MFR, hereinafter referred to as "PE (2)") in a mixing ratio of 3:7. The outer layer was a 30-μm-thick layer of PE (1). Containers having a plurality of chambers were prepared from the film by the above process wherein the sealing temperature was 158° C. for forming strong seal portions or 140° C. for forming weak seal portions. The containers were 100 ml in capacity and formed with easily peelable seal portions.

EXAMPLES 2–8 AND COMPARATIVE EXAMPLES 1 AND 2

The following multilayer films and containers having a plurality of chambers were prepared in the same manner as in Example 1.

The films used for comparative tests were a two-layer resin film having the same structure as described with reference to the prior art, and a three-layer film different from those of the invention.

EXAMPLE 2

Inner layer: resin mixture of PE (1)+PP (1) (2:1 in mixing ratio)
Intermediate layer: resin mixture of PE (1)+PE (2) (3:7 in mixing ratio)
Outer layer: PE (1)

EXAMPLE 3

Inner layer: resin mixture of PE(1)+PP (1) (1:1 in mixing ratio)
Intermediate layer: resin mixture of PE(1)+PE (2) (3:7 in mixing ratio)
Outer layer: PE (1)

EXAMPLE 4

Inner layer: resin mixture of PE (1)+PP (1) (2:3 in mixing ratio)
Intermediate layer: resin mixture of PE (1)+PE (2) (3:7 in mixing ratio)
Outer layer: PE (1)

EXAMPLE 5

Inner layer: resin mixture of PE (1)+PP (1) (3:2 in mixing ratio)
Intermediate layer
First layer: resin mixture of PE (1)+PE (2) (3:7 in mixing ratio)
Second layer: PE (1)
Third layer: resin mixture of PE (1)+PE (2) (3:7 in mixing ratio)
Outer layer: PE (1)

EXAMPLE 6

Inner layer: resin mixture of PE (1)+PP (1) (3:2 in mixing ratio)
Intermediate layer: resin mixture of PE(1)+PE (2) (3:7 in mixing ratio)
Outer layer: PE (1)

EXAMPLE 7

Inner layer: resin mixture of PE (1)+PP (1) (3:2 in mixing ratio)
Intermediate layer: resin mixture of PE (1)+PE (2) (3:7 in mixing ratio)
Outer layer: PE (1)

EXAMPLE 8

Inner layer: resin mixture of PE (1)+PP (1) (3:2 in mixing ratio)
Intermediate layer: resin mixture of PE (1)+PE (2) (3:7 in mixing ratio)
Outer layer: PE (1)

COMPARATIVE EXAMPLE 1

Inner layer: resin mixture of PE (3)+PP (2) (2:1 in mixing ratio)
PE (3): linear low-density polyethylene (ethylene-1-butene copolymer, product of Mitsui Petrochemical Industries, Ltd., 0.920 g/cm in density, 2.0 g/10 min (190° C.) in MFR, hereinafter referred to as "PE (3)")
PP (2): propylene random copolymer (ethylene-propylene copolymer, product of Mitsui Petrochemical Industries, Ltd., 0.910 g/cm$^3$ in density, 1.0 g/10 min (230° C.) in MFR, hereinafter referred to as "PP (2)")
Outer layer: PE (3)

COMPARATIVE EXAMPLE 2

Inner layer: resin mixture of PE (4)+PP (2) (3:2 in mixing ratio)
PE (4): linear high-density polyethylene (ethylene-1-butene copolymer, product of Mitsui Petrochemical Industries, Ltd., 0.961 g/cm$^3$ in density, 17 g/10 min (190° C.) in MFR, hereinafter referred to as "PE (4)")
Intermediate layer: resin mixture of PE (1)+PE(2) (3:7 in mixing ratio)
Outer layer: PE (1)

TEST EXAMPLES

The containers prepared in Examples 1–8 of the invention and Comparative Examples 1 and 2 were filled with distilled water in an amount of 50 ml in each of the chambers, then sterilized with hot water at 121° C. for 20 minutes and thereafter evaluated by the following test methods. Tables 1 and 2 below show the results.

For a heat resistance test, the container as sterilized was visually checked for deformation, rupture, leakage through the seal portions, creases and blocking as standards for the evaluation of heat resistance.

To evaluate transparency, the container was visually checked for white turbidity after the sterilization.

For the evaluation of flexibility, the enclosed liquid was allowed to spontaneously discharge from the container at room temperature from a height of 60 cm, and the container was visually observed.

To conduct a drop test for the evaluation of impact resistance, 10 containers held at a temperature of up to 5° C. were packed into a box (105 mm in width, 125 mm in length, 185 mm in height, 160 g in weight), and three such boxes were prepared. Each box was then allowed to fall from a position 1.2 m above the floor to give the impact of fall 10 times to each of sides, edges and corners of the box. After the three boxes were all subjected to the impact, the 30 containers were taken out from the boxes and each visually checked for cracking or rupture (according to JIS-Z-0202).

A compression test was conducted to evaluate the openability of the easily peelable seal portion. A compression jig, 100 mm in diameter, was attached to a tensile compression tester, STROGRAPH MZ, product of Toyo Seiki Seisakusho Co., Ltd, and the liquid enclosing portion was pressed by the jig at a rate of 50 mm/min to measure the pressure applied to the jig when the easily peelable seal portion was opened for the determination of variation coefficient of opening forces. The initial force applied for opening the easily peelable seal portion was determined from the range of 10 to 25 kg in accordance with the inner layer resin structure concerned. The opening force variation coefficient relatively represents variations in the easily peelable seal portion opening force, and was calculated from the following equation.

Opening force variation coefficient =

$$\frac{\text{Standard deviation of opening forces}}{\text{Average of opening forces}}$$

Additionally, the appearance of the entire container was visually checked for creases, deformation and rupture.

Overall evaluation was made based on the foregoing items of evaluation.

TABLE 1

|  | Thickness of outer layer (μ) | Thickness of intermediate layer (μ) | Thickness of inner layer (μ) | Overall thickness (μ) |
|---|---|---|---|---|
| Ex. 1 | PE 1 30μ | PE 1 + PE 2 115μ | PE 1 + PP 1 30μ | 175μ |
| Ex. 2 | PE 1 30μ | PE 1 + PE 2 115μ | PE 1 + PP 1 30μ | 175μ |
| Ex. 3 | PE 1 30μ | PE 1 + PE 2 115μ | PE 1 + PP 1 30μ | 175μ |
| Ex. 4 | PE 1 30μ | PE 1 + PE 2 115μ | PE 1 + PP 1 30μ | 175μ |
| Ex. 5 | PE 1 20μ | PE 1 + PE 2 60μ   PE 1 10μ   PE 1 + PE 2 60μ | PE 1 + PP 1 25μ | 175μ |
| Ex. 6 | PE 1 30μ | PE 1 + PE 2 125μ | PE 1 + PP 1 30μ | 175μ |
| Ex. 7 | PE 1 65μ | PE 1 + PE 2 80μ | PE 1 + PP 1 30μ | 175μ |

TABLE 1-continued

|  | Thickness of outer layer (μ) | Thickness of intermediate layer (μ) | Thickness of inner layer (μ) | Overall thickness (μ) |
|---|---|---|---|---|
| Ex. 8 | PE 1 50μ | PE 1 + PE 2 95μ | PE 1 + PP 1 30μ | 175μ |
| Comp. Ex. 1 | PE 3 125μ |  | PE 3 + PP 2 50μ | 175μ |
| Comp. Ex. 2 | PE 1 30μ | PE 1 + PE 2 115μ | PE 4 + PP 2 30μ | 175μ |

TABLE 2

|  | Drop test (number of ruptured containers) | Spontaneous dischargeability | Transparency | Compression test | Heat resistance | Appearance | Overall evaluation |
| --- | --- | --- | --- | --- | --- | --- | --- |
| Ex. 1 | ⊚ (0/30) | ⊚ | ⊚ | ⊚ | ⊚ | ⊚ | ⊚ |
| Ex. 2 | ⊚ (0/30) | ⊚ | ⊚ | ⊚ | ⊚ | ⊚ | ⊚ |
| Ex. 3 | ⊚ (0/30) | ⊚ | ⊚ | ⊚ | ⊚ | ⊚ | ⊚ |
| Ex. 45 | ⊚ (0/30) | ⊚ | ⊚ | ⊚ | ⊚ | ⊚ | ⊚ |
| Ex. 5 | ⊚ (0/30) | ⊚ | ⊚ | ⊚ | ⊚ | ⊚ | ⊚ |
| Ex. 6 | ⊚ (0/30) | ⊚ | ⊚ | ⊚ | ⊚ | ⊚ | ⊚ |
| Ex. 7 | ⊚ (0/30) | ⊚ | ○ | ⊚ | ⊚ | ○ | ⊚ |
| Ex. 8 | ⊚ (0/30) | ⊚ | ○ | ⊚ | ⊚ | ○ | ⊚ |
| Comp. Ex. 1 | * | * | X | * | X | X | X |
| Comp. Ex. 2 | X (10/30) | X | X | Δ | ⊚ | Δ | Δ |

In Table 2, the symbol ⊚ stands for "excellent," ○ for "good", Δ for "poor" and X for "unacceptable."

The test results given above (Table 2) will further be described in detail.

With respect to the opening force variation coefficient of the easily peelable seal portion obtained by the compression test, the containers of Examples 1 to 8 of the invention were 0.068 to 0.150, whereas the containers of Comparative Example 2 were 0.410, which represents great variations in the opening force.

The containers of Comparative Example 1 were insufficient in heat resistance, therefore failed to withstand sterilization at 121° C. for 20 minutes, melted and were unable to remain in shape. For this reason, it was impossible to conduct the drop test, spontaneous dischargeability test and compression test for the containers as indicated by the mark *.

Containers which were the same as those of Examples 1 to 8 were tested under the same conditions as above except that the density of PE (1) was altered from 0.941 g/cm³ to 0.940 g/cm³ (2.2 g/10 min (190° C.) in MFR, 2.4 in Mw/Mn), whereby substantially the same results as those achieved by Examples 1 to 8 were obtained.

While a propylene random copolymer was used as PP (2) in Comparative Examples 1 and 2, the same results as above were obtained when PP (1) was used in place of PP (2).

Thus, the present invention provides medical multilayer films which are outstanding in heat resistance, transparency, flexibility, impact resistance and easily peelable sealing properties. Use of these films further provides medical containers having a plurality of chambers and excellent in heat resistance, transparency, flexibility, impact resistance and easily peelable sealing properties.

We claim:

1. A medical multilayer film characterized in that the film comprises an inner layer, an intermediate layer and an outer layer each made primarily of a polyolefin, the inner layer being formed of resin mixture of an ethylene-alpha-olefin copolymer having a density of 0.930 to 0.945 g/cm³ and a polypropylene, the intermediate layer including at least one resin mixture layer of resin mixture of an ethylene-alpha-olefin copolymer having a density of 0.920 to 0.945 g/cm³ and an ethylene-alpha-olefin elastomer having a density of 0.880 to 0.890 g/cm³ in a mixing ratio by weight of 1:5 to 2:1, the resin mixture layer having a thickness of at least 85% of the overall thickness of the intermediate layer, and the outer layer being formed of an ethylene-alpha-olefin copolymer having a density of 0.930 to 0.945 g/cm³.

2. A medical multilayer film as defined in claim 1 wherein the ethylene-alpha-olefin copolymer of the intermediate layer has a density of 0.930 to 0.945 g/cm³.

3. A medical multilayer film as defined in claim 1 or 2 wherein the intermediate layer consists singly of the resin mixture layer.

4. A medical multilayer film as defined in claim 1 or 2 wherein the intermediate layer has a multilayer structure comprising the resin mixture layer and other resin layer formed at an intermediate portion of the layer, the other resin layer being made of an ethylene-alpha-olefin copolymer having a density of 0.930 to 0.945 g/cm³.

5. A medical multilayer film as defined in claim 1 wherein the ethylene-alpha-olefin copolymer used in each of the inner layer, the intermediate layer and the outer layer is 0.938 to 0.942 g/cm³ in density.

6. A medical multilayer film as defined in claim 1 wherein the ethylene-alpha-olefin copolymer used in each of the inner layer, the intermediate layer and the outer layer is 0.940 to 0.942 g/cm³ in density.

7. A medical multilayer film as defined in claim 1 or 2 wherein the ethylene-alpha-olefin elastomer used in the intermediate layer is 0.883 to 0.887 g/cm³ in density.

8. A medical multilayer film as defined in claim 1 or 2 wherein the ethylene-alpha-olefin copolymer and the ethylene-alpha-olefin elastomer serving as the components of the resin mixture layer for use in the intermediate layer are in a mixing ratio by weight of 2:5 to 1:2.

9. A medical multilayer film as defined in claim 1 or 2 wherein the ethylene-alpha-olefin copolymer and the ethylene-alpha-olefin elastomer serving as the components of the resin mixture layer for use in the intermediate layer are in a mixing ratio by weihgt of 3:7.

10. A medical multilayer film as defined in claim 4 wherein the intermediate layer has in the middle thereof the other resin layer of an ethylene-alpha-olefin copolymer having a density of 0.938 to 0.942 g/cm³.

11. A medical multilayer film as defined in claim 4 wherein the intermediate layer has in the middle thereof the other resin layer of an ethylene-alpha-olefin copolymer having a density of 0.940 to 0.942 g/cm³.

12. A medical multilayer film as defined in claim 1 or 2 wherein the ethylene-alpha-olefin copolymer and the polypropylene for use in forming the inner layer are in a mixing ratio by weight of 2:3 to 2:1.

13. A medical multilayer film as defined in claim 1 wherein the ethylene-alpha-olefin copolymer used for each of the inner layer, the intermediate layer, and the outer layer is 0.940 to 0.942 g/cm³ in density, the ethylene-alpha-olefin elastomer used for the intermediate layer is 0.883 to 0.887 g/cm³ in density, and the ethylene-alpha-olefin copolymer and the ethylene-alpha-olefin elastomer serving as the components of the resin mixture layer for use in the intermediate layer are in a mixing ratio by weight of 3:7.

14. A medical multilayer film as defined in claim 4 wherein the ethylene-alpha-olefin copolymer for use in each of the inner layer, the intermediate layer, the other layer and other layer to be formed at an intermediate portion of the intermediate layer is 0.940 to 0.942 g/cm³ in density the ethylene-alpha-olefin elastomer for use in the intermediate layer is 0.883 to 0.887 g/cm³ in density, and the ethylene-alpha-olefin copolymer and the ethylene-alpha-olefin elastomer serving as the components of the resin mixture layer for use in the intermediate layer are 3:7 in mixing ratio by weight.

15. A medical multilayer film as defined in claim 1 or 2 wherein the polypropylene for use in the inner layer is a propylene homopolymer.

16. A medical multilayer film as defined in claim 1 or 2 wherein the polypropylene for use in the inner layer is a copolymer of an alpha-olefin and propylene serving as the main comonomer.

17. A medical container having a plurality of chambers and formed of a medical multilayer film as defined in claim 1 or 2.

18. A medical container having a plurality of chambers and formed of a medical multilayer film as defined in claim 13.

19. A medical container having a plurality of chambers and formed of a medical multilayer film as defined in claim 14.

* * * * *